US009555558B2

(12) United States Patent
Steiner et al.

(10) Patent No.: US 9,555,558 B2
(45) Date of Patent: Jan. 31, 2017

(54) PROCESS FOR PRODUCING A PRODUCT

(75) Inventors: Manuel Steiner, Basel (CH); Andreas Diener, Grossschirma (DE); Oliver Tretzack, Hasel (DE); Wangqian Zhao, Singapore (SG)

(73) Assignee: LIST HOLDING AG, Arisdorf (CH)

( * ) Notice: Subject to any disclaimer, the term of this patent is extended or adjusted under 35 U.S.C. 154(b) by 133 days.

(21) Appl. No.: 13/639,987

(22) PCT Filed: Apr. 8, 2011

(86) PCT No.: PCT/EP2011/001765
§ 371 (c)(1),
(2), (4) Date: Jan. 3, 2013

(87) PCT Pub. No.: WO2011/124387
PCT Pub. Date: Oct. 13, 2011

(65) Prior Publication Data
US 2013/0093112 A1  Apr. 18, 2013

(30) Foreign Application Priority Data

Apr. 8, 2010 (DE) .................. 10 2010 014 298
Jun. 11, 2010 (DE) .................. 10 2010 017 339
Sep. 14, 2010 (DE) .................. 10 2010 037 530

(51) Int. Cl.
*B29C 47/00* (2006.01)
*D01D 1/02* (2006.01)
(Continued)

(52) U.S. Cl.
CPC .............. *B29C 31/00* (2013.01); *D01D 1/02* (2013.01); *D01F 1/02* (2013.01); *B29C 47/0083* (2013.01);
(Continued)

(58) Field of Classification Search
CPC ............ D01D 1/065; D01D 1/02; D01D 5/06; D01D 5/10; B29C 47/92; B29C 47/0083; B29C 2947/924; B29C 2947/92514; B29C 2947/92019; B29C 2947/92209; B29C 2947/92895; B29C 2947/92704; B29C 31/00; C08L 3/02; C08L 89/00; C08L 1/02; D01F 2/00; D01F 1/02
See application file for complete search history.

(56) References Cited

U.S. PATENT DOCUMENTS 2,838,792 A * 6/1958 Keight et al. .............. 264/37.26
3,033,697 A * 5/1962 Eskridge .................. 106/166.43
(Continued)

FOREIGN PATENT DOCUMENTS

CN    101353824 A    1/2009
DE    1713486        12/1955
(Continued)

OTHER PUBLICATIONS

European Patent Office, International Search Report, Written Opinion and International Preliminary Report on Patentability issued in counterpart International Application No. PCT/EP2011/001765. Date of Report: Oct. 9, 2012.
(Continued)

*Primary Examiner* — Jeffrey Wollschlager
(74) *Attorney, Agent, or Firm* — Fishman Stewart PLLC

(57) ABSTRACT

A method for production of a molded article from a base substance in a device for mixing of the base substance with a solvent is provided. The method includes mixing a base substance to produce a molding solution with the solvent and at least partially removing the solvent from the mixture; and feeding the molding solution to a device for further processing of a product and diluting the molding solution before further processing. In embodiments, the diluent is
(Continued)

introduced to the device before a discharge device and/or in the discharge device.

20 Claims, 1 Drawing Sheet

(51) Int. Cl.
| | |
|---|---|
| *B29C 31/00* | (2006.01) |
| *D01F 1/02* | (2006.01) |
| *D01D 1/06* | (2006.01) |
| *D01D 5/06* | (2006.01) |
| *C08L 1/02* | (2006.01) |
| *C08L 3/02* | (2006.01) |
| *B29C 47/92* | (2006.01) |
| *D01F 2/00* | (2006.01) |

(52) U.S. Cl.
CPC .......... *B29C 47/92* (2013.01); *B29C 2947/924* (2013.01); *B29C 2947/92019* (2013.01); *B29C 2947/92209* (2013.01); *B29C 2947/92514* (2013.01); *B29C 2947/92704* (2013.01); *B29C 2947/92895* (2013.01); *C08L 1/02* (2013.01); *C08L 3/02* (2013.01); *D01D 1/065* (2013.01); *D01D 5/06* (2013.01); *D01F 2/00* (2013.01)

(56) References Cited

U.S. PATENT DOCUMENTS

| | | | |
|---|---|---|---|
| 3,447,939 A | 6/1969 | Johnson | |
| 3,833,021 A | 9/1974 | Rose et al. | |
| 4,145,532 A | 3/1979 | Franks et al. | |
| 4,324,593 A | 4/1982 | Varga | |
| 4,416,698 A | 11/1983 | McCorsley, III | |
| 4,581,072 A | 4/1986 | Laity | |
| 5,094,690 A * | 3/1992 | Zikeli et al. | 106/200.2 |
| 5,354,524 A | 10/1994 | Sellars | |
| 5,407,266 A | 4/1995 | Dotsch et al. | |
| 5,534,113 A | 7/1996 | Quigley et al. | |
| 5,582,637 A | 12/1996 | Uneback et al. | |
| 5,688,455 A | 11/1997 | Kehl et al. | |
| 5,865,858 A | 2/1999 | Schrell et al. | |
| 6,488,876 B1 * | 12/2002 | Ruf | 264/186 |
| 6,610,134 B1 | 8/2003 | Kind et al. | |
| 6,875,756 B1 | 4/2005 | Michels et al. | |
| 7,645,474 B1 * | 1/2010 | Pathak | A61L 31/048 427/2.1 |
| 2003/0155673 A1 | 8/2003 | Zikeli et al. | |
| 2003/0186611 A1 * | 10/2003 | Zikeli | C08K 3/26 442/361 |
| 2005/0230860 A1 | 10/2005 | Bhushan et al. | |
| 2011/0024931 A1 | 2/2011 | Diener et al. | |

FOREIGN PATENT DOCUMENTS

| | | |
|---|---|---|
| DE | 4118884 A1 | 12/1992 |
| DE | 4441468 A1 | 5/1996 |
| DE | 19940521 A1 | 4/2001 |
| EP | 3700458 B1 | 8/1998 |
| RU | 2125623 C1 | 1/1999 |
| WO | 0026447 A1 | 5/2000 |
| WO | 0158960 A1 | 8/2001 |
| WO | WO2009098073 * | 8/2009 |

OTHER PUBLICATIONS

Database WPI; Week 200923; Thomson Scientific, London, G; An 2009-E88922, XP000002659418 and CN 101353824A (Univ Zhejiang); Jan. 28, 2009.
Andreas Diener, Oliver Tretzack: "Continuous Masterbatch Process for the Cellulose Fiber Industry;" Chemical Fibers International, vol. 3, 2011, pp. 138-139, the whole document.

* cited by examiner

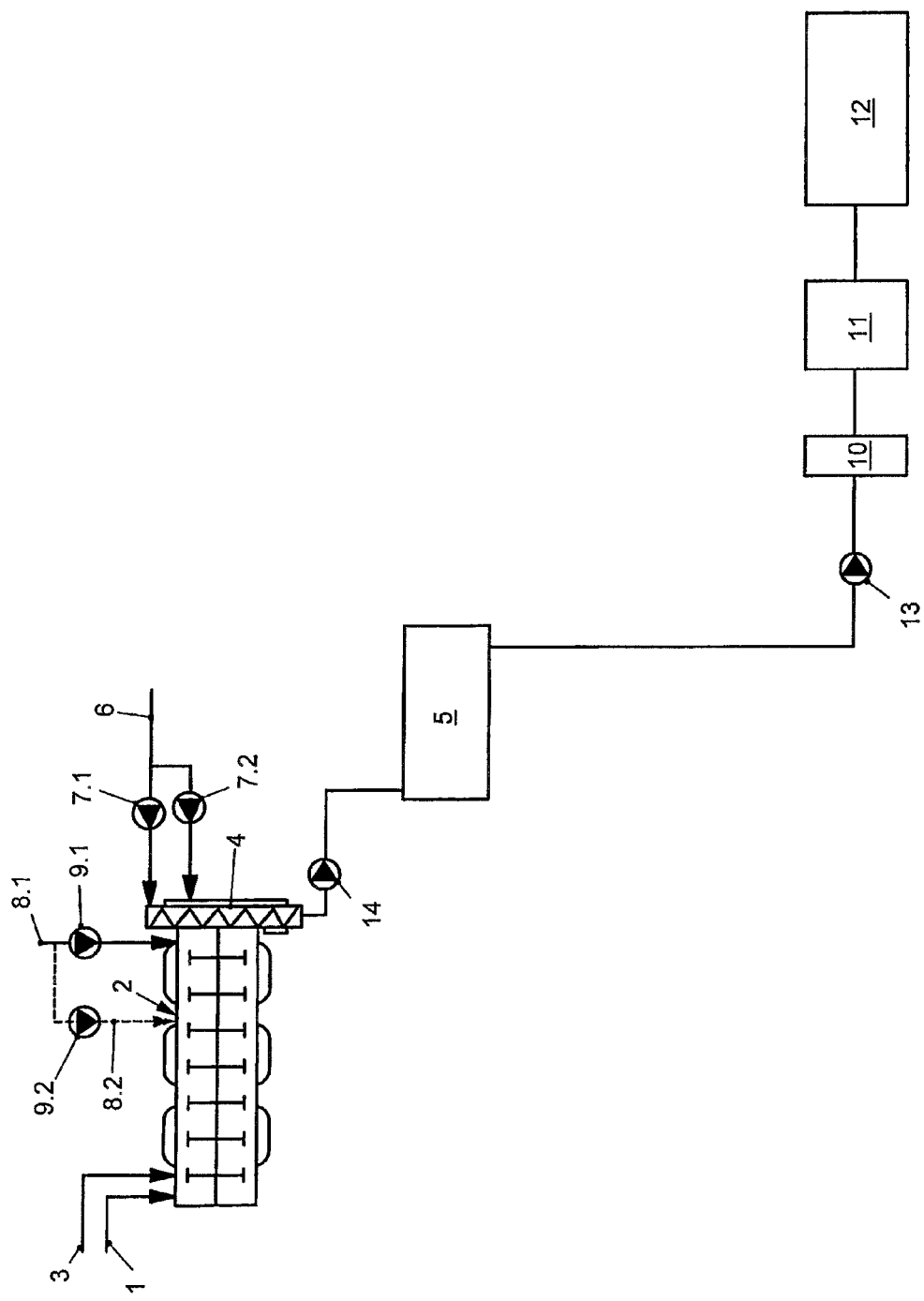

PROCESS FOR PRODUCING A PRODUCT

CROSS-REFERENCE TO RELATED APPLICATION

This application is a national stage filing based upon International PCT Application No. PCT/EP2011/001765, with an international filing date of Apr. 8, 2011, which claims the benefit of priority to German patent application Nos. 10 2010 014 298.0, filed Apr. 8, 2010; 10 2010 017 339.8, filed Jun. 11, 2010; and 10 2010 037 530.6, filed Sep. 14, 2010, all of which are fully incorporated herein by reference as though fully set forth herein.

The present invention concerns a process for production of a product, especially molded articles, from a base substance in an apparatus for mixing of the base substance with a solvent, in which the base substance is mixed to produce a molding solution with the solvent and the solvent is then at least partially removed from this mixture and the molding solution fed to a device for further processing of the product, the molding solution being diluted before molding.

BACKGROUND

In the present case the product can be converted to any state of aggregation, for example, to a liquid or molded article. The term "molded article" subsumes all possible articles produced from a natural or artificial base substance. This generally occurs by means of a molding die, with which the base substance is brought into a shape for the molded article. As an example, which is in no way restrictive or conclusive, viscose fibers are mentioned.

Viscose fibers are fibers consisting of the base material cellulose and are produced industrially via the viscose method. The chemical nature of viscose fibers is equivalent to that of cotton fibers.

Modal fibers are a product similar to viscose fibers. They also consist of 100% cellulose and, like viscose fibers, are produced from natural cellulose. Through a somewhat different process, however, higher fiber strength and improved fiber properties are achieved.

Tencel and lyocell fibers are also classified among the cellulose fibers. In the lyocell fibers the cellulose is dissolved directly and unchanged by the nontoxic solvent NMMO (N-methylmorpholine-N-oxide) without prior reaction with NaOH and derivatization to xanthate. Spinning of the lyocell fibers occurs in a dilute, aqueous NMMO bath, in which the solubility limit of cellulose is fallen short of and a fiber is formed on this account. For this purpose the corresponding spinning solution is forced through spinnerets. This lyocell method is described, for example, in DE 1 713 486, U.S. Pat. No. 3,447,939 or GB 8 216 566. Production of the appropriate spinning solution occurs in a horizontally operating kneading reactor, as shown in DE 198 37 210 or WO 02/20885 A1.

The spinning solution in these devices and according to the known methods is produced in the viscosity and corresponding cellulose concentration necessary for the subsequent spinning process. Corresponding devices for spinning, however, can only process a spinning solution with low viscosity, which, however, reduces the effectiveness of the process for production of the spinning solution. Very low viscosities and therefore low cellulose contents are necessary for special applications, in which the spinning solutions can no longer be effectively produced with the known technology.

A method of the aforementioned type is also known from WO 2009/098073, according to which the molding solution is diluted before the molding process. This means that the highly viscous spinning solution, whose viscosity lies above a viscosity that permits spinning, is temporarily stored, optionally heated and then brought to the viscosity of the desired molding solution in its own special reactor with a diluent.

The underlying task of the present invention is to simplify the aforementioned process and configure the corresponding production installation leaner.

BRIEF SUMMARY

To solve the task the diluent is fed to the device upstream of a discharge device and/or in the discharge device.

This means that the finished molding solution is present from the discharge so that it can be temporarily stored in a buffer vessel. In the event that consumption of the molding solution must also occur, the buffer vessel drops out and the finished molding solution is further processed, for example, fed directly to a molding device.

In contrast to WO 2009/098073, the idea is now no longer to separate production of the molding solution (for example, spinning solution) and molding (spinning) from each other, but for the molding solution to already be present at the output from the first kneading reactor with the viscosity necessary for final shaping. It has turned out that a relatively high viscosity can be used in the known kneading reactors before the discharge device so that this advantage is also present according to the new process according to the invention. Only toward the end of treatment in the kneading reactor or even only in the discharge device itself does dilution to the viscosity desired for the molding solution then occur according to the invention.

It is of subordinate significance in the present process which molded articles are produced. Filaments, nonwovens or filament yarn are preferably produced. However, films, hollow fibers, membranes or the like can also be produced. Shaping of the solution to a desired cellulose molded article can occur with known spinnerets to produce fibers, slotted nozzles or hollow fiber spinnerets. Following molding, i.e., before introduction of the formed solution into the coagulation bath, it can also be stretched.

A tertiary amine oxide, especially an amine oxide monohydrate, is preferably used as solvent. However, the invention is not restricted to this. The invention is also not restricted to cellulose, but also includes such substances as proteins, polylactides or starch or a mixture of these substances.

A tertiary amine can also be used as diluent, but other diluents are also considered.

As in WO 2009/098073 the concentration of the molding solution and/or the diluent is to be monitored via the optical index (refractive index). This occurs in the diluent before introduction to the molding solution and/or in the molding solution after dilution. An optical index of the diluent and/or molding solution in the range from 1.40 to 1.50 is desired.

In order to provide better and more effective mixing of the diluent in the molding solution, the molding solution should be retained according to the invention after the discharge device. This can occur, for example, with a pump running at reduced speed. Retention means that the molding solution spends a longer time in the discharge device and is mixed better there with the diluent.

In another practical example of the invention the molding solution can be supplied an additive before the discharge device and/or in the discharge device. The additive should preferably be fed together with the diluent.

BRIEF DESCRIPTION OF THE DRAWING

Additional advantages, features and details of the invention are apparent from the following description of preferred practical examples and with reference to the drawing; the drawing and its only FIGURE shows a block diagram for the process according to the invention for production of molded articles from a base substance, especially from renewable raw materials.

DETAILED DESCRIPTION

The cellulose necessary for this is fed to a kneading reactor 2 by a feed line 1. Such horizontal kneading reactors are known, for example, from DE 199 40 521 A1 or DE 41 18 884. The invention, however, is not restricted to these kneading reactors. All treatment devices in which renewable raw materials can be subjected to treatment for later spinning are embraced by the invention.

In the present practical example treatment of the renewable raw material occurs by means of a solvent, preferably amine oxide monohydrate, which is fed to the kneading reactor via an additional feed line 3.

Intensive mixing of the raw material with the solvent with supply of heat occurs in the kneading reactor 2 and also evaporation of the solvent so that a relatively highly viscous spinning solution is formed. The spinning solution is then optionally fed to a buffer vessel 5 via a discharge device 4. There it is temporarily stored, if necessary, with addition of heat.

However, according to the invention this relatively highly viscous spinning solution is to be diluted before it is optionally fed to the buffer vessel 5 or directly to final processing. According to the invention this occurs in the discharge device 4 or even just before the discharge device 4 in the kneading reactor 2 toward the end of the kneading reactor. A combination of both addition locations is also contemplated.

An additional feed line 6 is provided to add the diluent to the discharge device 4, in which a pump 7 is incorporated. An additional or other feed line for the diluent is indicated by reference number 8. A pump 9 is also incorporated in this feed line 8.

Another pump 14 is incorporated between a discharge 4 and the optional buffer vessel 5 by means of which the molded solution is held up after the discharge.

The method according to the invention is conducted as follows:

Introduction of the base substance, especially the renewable raw material, and the solvent to kneading reactor 2 occurs via feed line 1 and feed line 3. With supply of heat intense mixing occurs, in which case heat supply can occur from the outside by means of a heating jacket, through heated kneading shafts and/or heated kneading elements (disk elements). Further mechanical heat input occurs during mixing itself through the corresponding shear energy. Through the evaporation of the solvent the forming solution (spinning solution) will be concentrated up so that it has such a high amount of the base substance toward the end of the kneading reactor 2 shortly before the discharge device 4, that it is now too highly viscous for a later spinning. It is now diluted with a diluent, which is supplied via feed line 8 and/or feed line 6. The concentration of the molding solution and/or the diluent is then monitored via the optical index.

This optical index is also referred to as refractive index. It characterizes the refraction (change in direction) and reflection behavior (reflection and total reflection) of electromagnetic waves on encountering an interface between two media.

In the present case the optical index of the diluent before introduction to the molding solution and the optical index in the molding solution after dilution are preferably monitored. The optical index of the diluent and/or molding solution should lie at 1.40 to 1.50.

It is also conceived to supply an additive to the molding solution/mixture before discharge or in the discharge, optionally also via feed line 6 or 8. The additive can also be fed together with the diluent.

As soon as the spinning solution is used, removal of the diluted spinning solution occurs from the buffer vessel 5 and by means of a pump 13 it is forced through a spinning solution filter 10. Homogenization of a spinning solution occurs on this account. The spinning solution can then be temporarily stored in another buffer vessel 11, if necessary. Actual spinning then occurs in a device 12.

The invention claimed is:

1. A method for production of a molded article from a base substance, the method comprising:
   mixing a base substance and a solvent in a reactor to produce a molding solution;
   at least partially removing the solvent from the molding solution in the reactor; and
   diluting the molding solution with a diluent to decrease a viscosity of the molding solution;
   wherein, after at least partially removing the solvent from the molding solution, the diluent is introduced to the molding solution toward an end of the reactor adjacent to a discharge device or in the discharge device of the reactor; and the diluent is introduced to the molding solution prior to a pump associated with the discharge device pumping the molding solution from the discharge device and prior to the molding solution being at least temporarily stored in a buffering vessel; and the diluent is not removed from the molding solution.

2. The method of claim 1, wherein the diluent is introduced to the molding solution toward an end of the reactor adjacent to the discharge device or in the discharge device of the reactor, and the molding solution is held up after the discharge device.

3. The method of claim 1, wherein the concentration of the molding solution or the concentration of the diluent is monitored via an optical index.

4. The method of claim 1, wherein the concentration of the molding solution and the diluent are monitored via an optical index.

5. The method of claim 3, wherein the optical index of the diluent is monitored before introduction to the molding solution or the optical index is monitored in the molding solution after dilution.

6. The method of claim 4, wherein the optical index of the diluent is monitored before introduction to the molding solution and the optical index is monitored in the molding solution after dilution.

7. The method of claim 3, wherein the optical index of the diluent or the molding solution lies at or between 1.40 and 1.50.

8. The method of claim 4, wherein the optical index of the diluent and the molding solution lies at or between 1.40 and 1.50.

9. The method of claim 1, wherein an additive is supplied to the molding solution before the discharge device, in the discharge device, or before the discharge device and in the discharge device.

10. The method of claim 9, wherein the additive is fed together with the diluent.

11. The method of claim 9, wherein the additive is an inorganic material suspended in the diluent.

12. The method of claim 9, wherein the additive is an organic material suspended or dissolved in the diluent.

13. The method of claim 9, wherein the additive is a mixture of different organic and inorganic materials.

14. The method of claim 13, wherein the additive mixture is suspended in the solvent or suspended in the diluent.

15. The method of claim 9, wherein the additive is ground before addition with or without diluent.

16. The method of claim 14, wherein the additive mixture is ground before addition with or without diluent.

17. The method of claim 1, wherein the diluent is tertiary amine oxide.

18. The method of claim 1, wherein the diluent is an aqueous tertiary amine oxide.

19. The method of claim 1, wherein an additive or an additive mixture is supplied to the molding solution before the discharge device, in the discharge device, or before the discharge device and in the discharge device; and the additive or additive mixture is chosen so that it also deliberately influences the properties of the molding solution.

20. The method of claim 1, wherein the diluent is introduced toward the end of the reactor adjacent to the discharge device and in the discharge device of the reactor.

* * * * *